US009108312B2

(12) United States Patent
Elger et al.

(10) Patent No.: US 9,108,312 B2
(45) Date of Patent: Aug. 18, 2015

(54) MULTI-STAGE TRANSMISSION FOR A POWER TOOL

(71) Applicant: Milwaukee Electric Tool Corporation, Brookfield, WI (US)

(72) Inventors: William A. Elger, West Bend, WI (US); Kurt Limberg, Milwaukee, WI (US); Alexander L. Kapelevich, Shoreview, MN (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 14/023,766

(22) Filed: Sep. 11, 2013

(65) Prior Publication Data

US 2014/0080659 A1 Mar. 20, 2014

Related U.S. Application Data

(60) Provisional application No. 61/699,427, filed on Sep. 11, 2012.

(51) Int. Cl.
*F16H 3/74* (2006.01)
*B25B 23/147* (2006.01)
*B25F 5/00* (2006.01)

(52) U.S. Cl.
CPC ..................................... *B25F 5/001* (2013.01)

(58) Field of Classification Search
CPC ......... B25F 5/00; B25F 5/001; B25B 21/008; B25B 23/147; F16H 3/74
USPC ......... 475/269, 275, 290, 293, 296, 298–300, 475/317, 330; 192/69.9, 84.2, 85.18; 173/47, 93.5, 132, 141, 178, 217, 216, 173/213
See application file for complete search history.

(56) References Cited

U.S. PATENT DOCUMENTS

| | | | | |
|---|---|---|---|---|
| 3,119,274 | A | 1/1964 | Short | |
| 4,229,981 | A | 10/1980 | Macky | |
| 4,232,749 | A | 11/1980 | Rohrbach | |
| 4,479,555 | A | 10/1984 | Grossmann et al. | |
| 4,763,733 | A | 8/1988 | Neumaier | |
| 4,791,833 | A * | 12/1988 | Sakai et al. | 475/299 |
| 5,339,908 | A | 8/1994 | Yokota et al. | |
| 5,458,206 | A | 10/1995 | Bourner et al. | |
| 5,505,271 | A | 4/1996 | Bourner | |
| 5,616,096 | A | 4/1997 | Hagiwara | |
| 5,628,374 | A | 5/1997 | Dibbern, Jr. | |
| 5,711,379 | A | 1/1998 | Amano et al. | |

(Continued)

*Primary Examiner* — Robert Hodge
*Assistant Examiner* — Tinh Dang
(74) *Attorney, Agent, or Firm* — Michael Best & Friedrich LLP

(57) ABSTRACT

A multi-stage planetary transmission includes a transmission housing and a first planetary stage at least partially positioned in a transmission housing. The first planetary stage includes a first stage ring gear, a first stage carrier, and a plurality of first stage planet gears supported by the first stage carrier. A motor output pinion is engaged with each of the first stage plant gears. The transmission further includes a second planetary stage positioned downstream of the first planetary stage to receive torque from the first planetary stage and a shift mechanism operable to move the first stage ring gear between a first position, in which the first stage ring gear is rotatably fixed relative to the transmission housing for enabling the first planetary stage, and a second position, in which the first stage ring gear is coupled for co-rotation with the first stage carrier for disabling the first planetary stage.

18 Claims, 3 Drawing Sheets

(56) References Cited

U.S. PATENT DOCUMENTS 6,070,675 A 6/2000 Mayer et al.
6,415,487 B1 7/2002 Leimer
6,431,289 B1 * 8/2002 Potter et al. .................... 173/47
RE37,905 E 11/2002 Bourner et al.
6,550,546 B2 4/2003 Thurler et al.
6,656,076 B2 12/2003 Strowik et al.
6,691,796 B1 2/2004 Wu
6,719,670 B1 4/2004 Wu et al.
6,860,341 B2 3/2005 Spielmann et al.
6,983,810 B2 1/2006 Hara et al.
6,984,188 B2 1/2006 Potter et al.
7,073,605 B2 7/2006 Saito et al.
7,093,670 B2 8/2006 Saito et al.
7,174,969 B2 2/2007 Droste
7,213,659 B2 5/2007 Saito et al.
7,308,948 B2 12/2007 Furuta
7,334,646 B2 2/2008 Hara et al.
7,407,460 B2 8/2008 Eisenhardt
7,607,493 B2 10/2009 Erhardt
7,658,238 B2 2/2010 Toukairin et al.
7,735,575 B2 6/2010 Trautner
7,806,199 B2 10/2010 Pohl et al.
7,896,097 B2 3/2011 Teng
7,900,715 B2 3/2011 Chen
7,987,920 B2 8/2011 Schroeder et al.
8,074,735 B2 12/2011 Aeberhard et al.
8,083,007 B2 12/2011 Inagaki et al.
8,104,544 B2 1/2012 Ullrich et al.
8,109,343 B2 2/2012 Schroeder et al.
8,235,137 B2 8/2012 Walker et al.
8,251,156 B2 8/2012 Norona et al.
8,251,158 B2 8/2012 Tomayko et al.
2007/0084614 A1 4/2007 Whitmire et al.
2010/0193207 A1 8/2010 Mok et al.
2011/0048750 A1 3/2011 Leong et al.
2011/0147021 A1 6/2011 Schaal et al.
2011/0220377 A1 9/2011 Roehm
2011/0220380 A1 * 9/2011 Roehm ........................ 173/216
2011/0247848 A1 10/2011 Sieber et al.
2011/0259620 A1 10/2011 Roehm
2011/0275471 A1 * 11/2011 Roehm et al. ................ 475/269
2012/0028753 A1 * 2/2012 Atsumi et al. ............... 475/298
2012/0175142 A1 7/2012 Van Der Linde et al.
2012/0205131 A1 8/2012 Furusawa et al.
2012/0214640 A1 8/2012 Saur

* cited by examiner

MULTI-STAGE TRANSMISSION FOR A POWER TOOL

CROSS-REFERENCE TO RELATED APPLICATIONS

This application claims priority to co-pending U.S. Provisional Patent Application No. 61/699,427 filed Sep. 11, 2012, the entire content of which is incorporated herein by reference.

FIELD OF THE INVENTION

The invention relates to power tools, and more particularly to power tool transmissions.

BACKGROUND OF THE INVENTION

Power tool transmissions are often user-configurable to provide different speed outputs of the power tool. For example, an operator of a multi-speed drill may configure the drill for high-speed operation or low-speed operation by actuating a switch on the drill.

SUMMARY OF THE INVENTION

The invention provides, in one aspect, a multi-stage planetary transmission powered by an electric motor having an output pinion. The multi-stage planetary transmission includes a transmission housing and a first planetary stage at least partially positioned in the transmission housing. The first planetary stage includes a first stage ring gear, a first stage carrier, and a plurality of first stage planet gears supported by the first stage carrier. The motor output pinion is engaged with each of the first stage plant gears. The transmission further includes a second planetary stage positioned downstream of the first planetary stage to receive torque from the first planetary stage and a shift mechanism operable to move the first stage ring gear between a first position, in which the first stage ring gear is rotatably fixed relative to the transmission housing for enabling the first planetary stage, and a second position, in which the first stage ring gear is coupled for co-rotation with the first stage carrier for disabling the first planetary stage.

The invention provides, in another aspect, a rotary power tool including an electric motor having an output pinion, a bit retainer in which a tool bit is receivable, and a multi-stage planetary transmission coupling the motor and the bit retainer. The multi-stage planetary transmission includes a transmission housing and a first planetary stage at least partially positioned in the transmission housing. The first planetary stage includes a first stage ring gear, a first stage carrier, and a plurality of first stage planet gears supported by the first stage carrier. The motor output pinion is engaged with each of the first stage plant gears. The transmission further includes a second planetary stage positioned downstream of the first planetary stage to receive torque from the first planetary stage and a shift mechanism operable to move the first stage ring gear between a first position, in which the first stage ring gear is rotatably fixed relative to the transmission housing for enabling the first planetary stage, and a second position, in which the first stage ring gear is coupled for co-rotation with the first stage carrier for disabling the first planetary stage.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
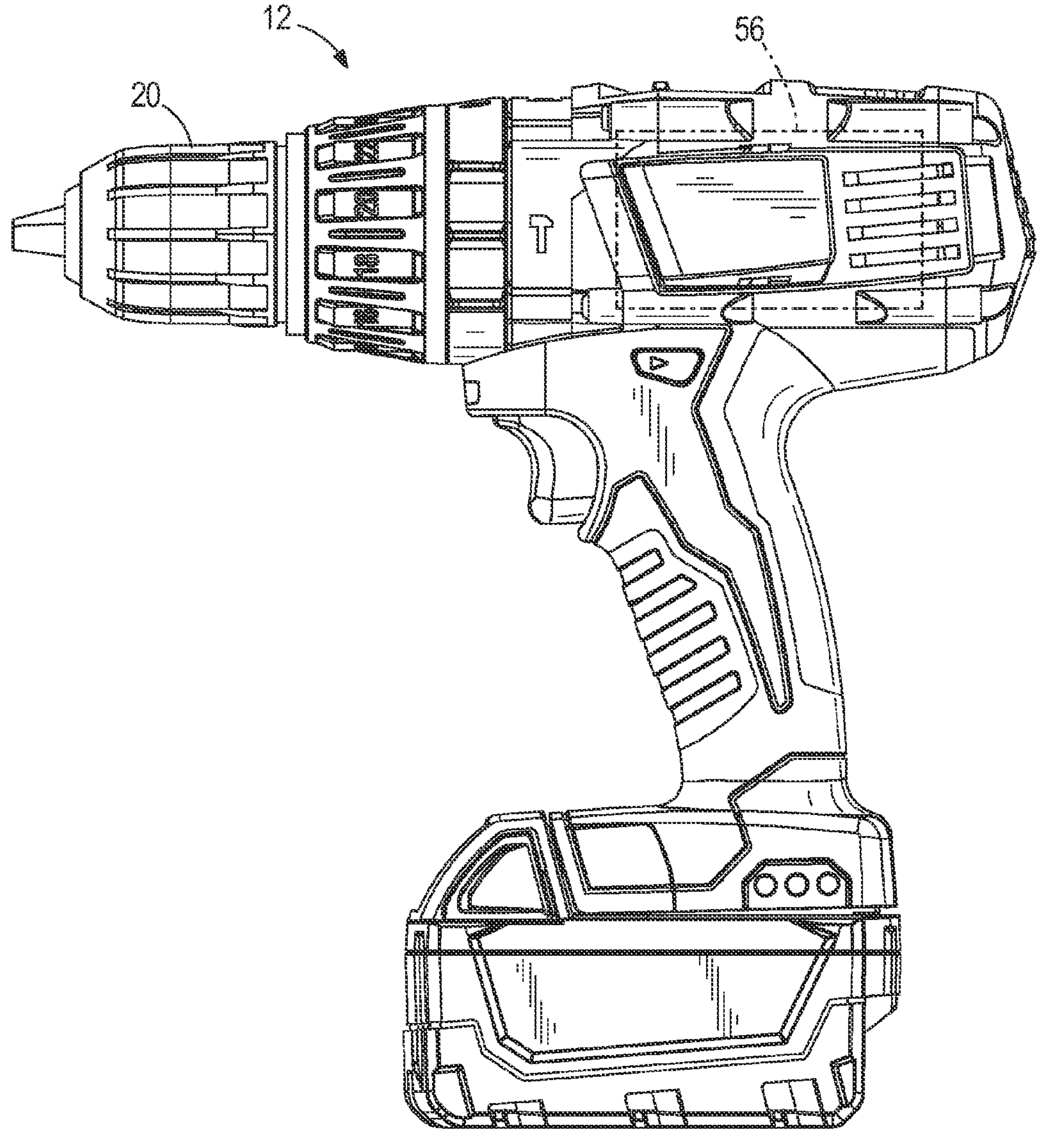
FIG. 1 is a side view of rotary power tool.
Figure 2:
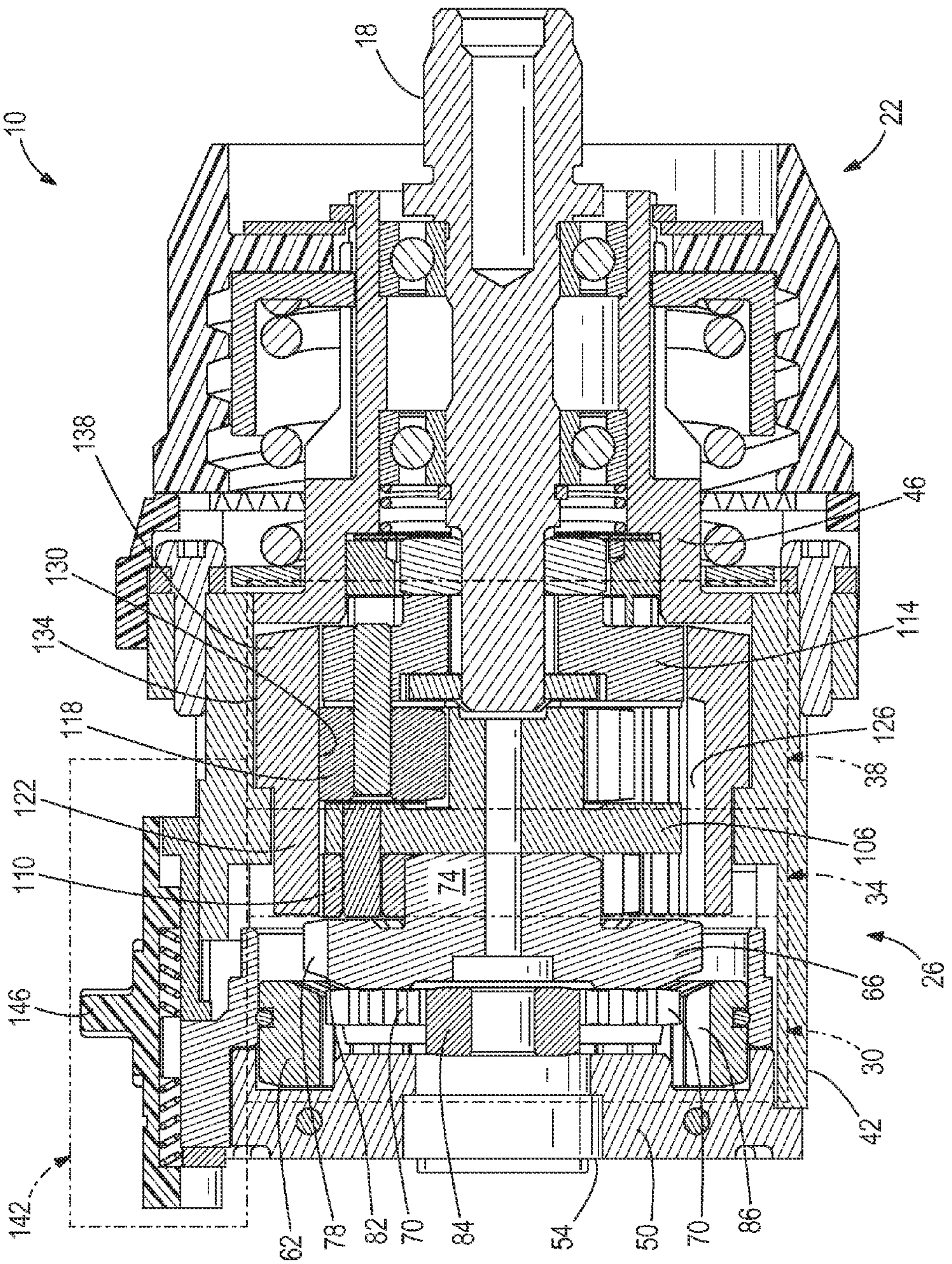
FIG. 2 is a cross-sectional view of a multi-stage planetary transmission for use in the power tool of FIG. 1 configured for operation in a low-speed, high-torque mode.

FIG. 2 illustrates a multi-stage planetary transmission 10 for use with a rotary power tool 12 (e.g., a drill, etc.; FIG. 1). An output of the transmission 10 (FIG. 2) is coupled to an output shaft 18 which, in turn, may be coupled to a conventional tool chuck or bit retainer 20 (FIG. 1) in a conventional manner. An adjustable clutch mechanism 22 (FIG. 2) may also be used in conjunction with the transmission 10 to selectively limit the amount of torque that may be transferred from the transmission 10 to the output shaft 18, the operational details of which are described in detail below. However, the transmission 10 need not be used in conjunction with the adjustable clutch mechanism 22.

With continued reference to FIG. 2, the transmission 10 includes a transmission housing 26 and three planetary stages 30, 34, 38, the last of which is coupled to the output shaft 18. In the illustrated construction of the transmission 10, the transmission housing 26 includes a rear housing portion 42 containing therein the three planetary stages 30, 34, 38, a front housing portion 46 through which the output shaft 18 extends, and an end cap 50 coupled to the rear housing portion 42. Alternatively, the transmission housing 26 may be divided into any number of portions, or may be configured as a substantially unitary structure. The end cap 50 also provides a mount 54 to which an electric motor 56 (FIG. 1) may be coupled.

With reference to FIG. 2, the first planetary stage 30 includes a first stage ring gear 62, a first stage carrier 66, and a plurality of first stage planet gears 70. With continued reference to FIG. 2, the first stage carrier 66 includes a sun gear 74, which is a component of the second planetary stage 34, extending from the front of the carrier 66. A plurality of axles (not shown) also extend from the rear of the carrier 66 upon which the first stage planet gears 70 are rotatably supported. The first stage carrier 66 also includes a plurality of projections 78 that extend radially outwardly from an outer circumferential surface 82 of the carrier 66, the purpose of which is described below. The first stage planet gears 70 are engaged to an input pinion 84 which, in turn, is coupled to the output shaft of the motor for transferring torque to the three planetary stages 30, 34, 38.

Figure 3:
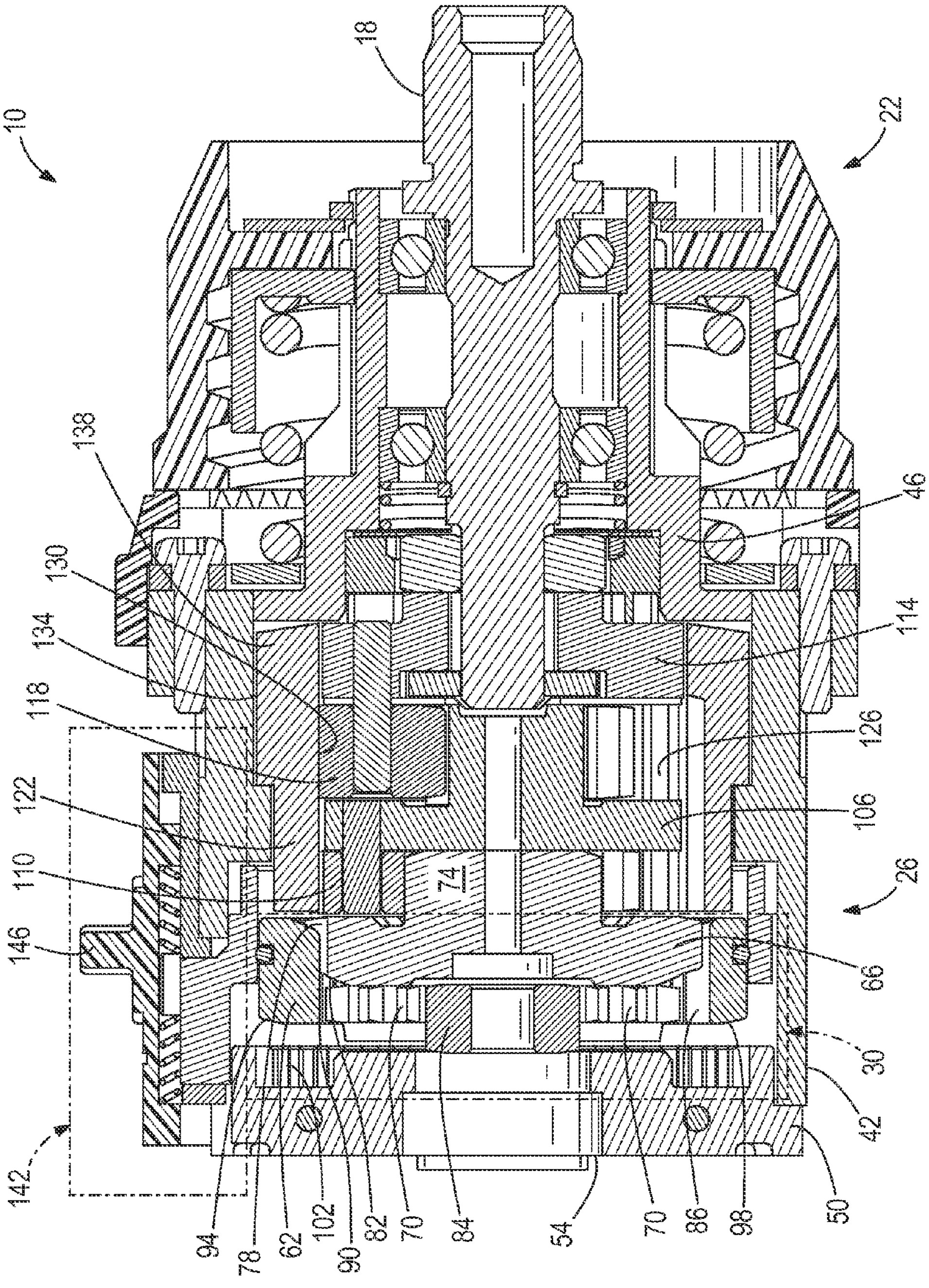
FIG. 3 is a cross-sectional view of the transmission of FIG. 2 configured for operation in a high-speed, low-torque mode.

With reference to FIG. 3, the first stage ring gear 62 is annular and has a plurality of teeth 86 on an inner circumferential surface 90 of the ring gear 62 that are selectively meshed with the plurality of first stage planet gears 70. The first stage ring gear 62 also includes a plurality of teeth 94 on an outer circumferential surface 98 of the ring gear 62 that are engageable with corresponding teeth 102 on the inner peripheral surface of the end cap 50. The outer circumferential surface 98 of the first stage ring gear 62 is cylindrical to enable to the first stage ring gear 62 to selectively rotate within the transmission housing 26.

With reference to FIG. 2, the second planetary stage 34 includes a second stage carrier 106 and a plurality of second stage planet gears 110. Likewise, the third planetary stage 38 includes a third carrier 114 and a plurality of third stage planet gears 118. The second planetary stage 34 and the third planetary stage 38 share a common ring gear 122. The second planetary stage 34 is positioned downstream of the first planetary stage 30 to receive torque from the first planetary stage 30. Likewise, the third planetary stage 38 is positioned downstream of the second planetary stage 34 to receive torque from the second planetary stage 34.

The third carrier 114 is directly coupled to the output shaft 18. The third carrier 114 may be coupled to the output shaft 18 in any of a number of different ways (e.g., by using a key and keyway arrangement, an interference fit, a spline-fit, etc.)

With continued reference to FIG. 2, the common ring gear 122 is annular and has a plurality of teeth 126 on an inner circumferential surface 130 of the common ring gear 122 that mesh with the plurality of second stage planet gears 110 and the plurality of third stage planet gears 118. An outer circumferential surface 134 of the common ring gear 122 is cylindrical to enable the common ring gear 122 to selectively rotate within the transmission housing 26. A plurality of clutch dogs or ramps (not shown) extend from a front end 138 of the common ring gear 122 for engagement with the clutch mechanism 22. The clutch mechanism 22 allows the common ring gear 122 to rotate within the transmission housing 26 in response to the output shaft 18 seizing as a result of a reaction torque being applied to the output shaft 18 by a workpiece (e.g., a fastener) substantially equal to the torque setting of the clutch mechanism 22.

With reference to FIGS. 2 and 3, the transmission 10 further includes a shift mechanism 142 operable to move the first stage ring gear 62 between a first position (FIG. 2), in which the first stage ring gear 62 is rotatably fixed relative to the transmission housing 26 for enabling the first planetary stage 30, and a second position (FIG. 3), in which the first stage ring gear 62 is coupled for co-rotation with the first stage carrier 66 for disabling the first planetary stage 30. In the illustrated construction of the transmission 10, the shift mechanism 142 includes a linearly movable shuttle 146 for shifting the first stage ring gear 62 between first and second positions. Alternatively, the shift mechanism 142 may be configured in any of a number of different ways for displacing the first stage ring gear 62 between the first and second positions.

Operation of the multi-speed planetary transmission 10 will now be discussed with respect to FIGS. 2 and 3.

FIG. 2 illustrates the multi-stage planetary transmission 10 configured in a low-speed, high torque mode. In this mode, the shuttle 146 and first stage ring gear 62 are shifted to the first position (i.e., to the left as shown in FIG. 2), thereby engaging the respective teeth 86, 102 on the first stage ring gear 62 and the end cap 50 (FIG. 3) to inhibit relative rotation between the first stage ring gear 62 and the transmission housing 26. The first stage ring gear 62 is also engaged with the plurality of first stage planet gears 70 in the first position. The first stage ring gear 62 remains fixed relative to the transmission housing 26 to enable the first planetary stage 30.

FIG. 3 illustrates the multi-stage planetary transmission 10 in a high-speed, low torque mode. In this mode, the shuttle 146 and the first stage ring gear 62 are shifted to the second position (i.e., to the right as shown in FIG. 3), thereby disengaging the first stage ring gear 62 from the end cap 50 and engaging the respective teeth 86, 78 of the first stage ring gear 62 and the first stage carrier 66. In this position, the first stage ring gear 62 co-rotates with the first stage carrier 66 for disabling the first planetary stage 30. It should also be understood that when the first stage ring gear 62, when in the second position, rotationally interlocks the motor output shaft with all of the components of the first planetary stage 30 and the second stage sun gear 74 extending from the first stage carrier 66.

Various features of the invention are set forth in the following claims.

What is claimed is:

1. A multi-stage planetary transmission powered by an electric motor having an output pinion, the transmission comprising:

a transmission housing;

a first planetary stage at least partially positioned in the transmission housing and including a first stage ring gear, a first stage carrier, and a plurality of first stage planet gears supported by the first stage carrier and rotatable relative thereto, the motor output pinion being engaged with each of the first stage planet gears;

a second planetary stage positioned downstream of the first planetary stage to receive torque from the first planetary stage;

a third planetary stage positioned downstream of the second planetary stage to receive torque from the second planetary stage, the second and third planetary stages sharing a one-piece common ring gear; and a shift mechanism operable to move the first stage ring gear between a first position, in which the first stage ring gear is rotatably fixed relative to the transmission housing for enabling the first planetary stage, and a second position, in which the first stage ring gear is coupled for co-rotation with the first stage carrier about a central axis for disabling the first planetary stage, wherein an axial position of the common ring gear along the central axis remains unchanged when the first stage ring gear is moved between the first position and the second position.

2. The multi-stage planetary transmission of claim 1, wherein the transmission is operable in a low speed, high torque mode when the first stage ring gear is moved to the first position.

3. The multi-stage planetary transmission of claim 1, wherein the transmission is operable in a high speed, low torque mode when the first stage ring gear is moved to the second position.

4. The multi-stage planetary transmission of claim 1, wherein the transmission housing includes a first plurality of teeth, and wherein the first stage ring gear includes a second plurality of teeth engaged with the first plurality of teeth on the transmission housing when the first stage ring gear is in the first position.

5. The multi-stage planetary transmission of claim 1, wherein the first stage ring gear includes a first plurality of teeth with which the plurality of first stage planet gears are engageable, and wherein the first stage carrier includes a second plurality of teeth engaged with the first plurality of teeth on the first stage ring gear when the first stage ring gear is in the second position.

6. The multi-stage planetary transmission of claim 1, wherein the shift mechanism includes a linearly movable shuttle for shifting the first stage ring gear between the first and second positions.

7. The multi-stage planetary transmission of claim 1, wherein the motor output pinion and the first planetary stage are co-rotatable when the first planetary stage is disabled.

8. The multi-stage planetary transmission of claim 1, wherein the transmission is incorporated in a power tool.

9. A rotary power tool comprising:

an electric motor having an output pinion;

a bit retainer in which a tool bit is receivable; and a multi-stage planetary transmission coupling the motor and the bit retainer, the transmission including a transmission housing;

a first planetary stage at least partially positioned in the transmission housing and including a first stage ring gear, a first stage carrier, and a plurality of first stage planet gears supported by the first stage carrier and rotatable relative thereto, the motor output pinion being engaged with each of the first stage planet gears;

a second planetary stage positioned downstream of the first planetary stage to receive torque from the first planetary stage;

a third planetary stage positioned downstream of the second planetary stage to receive torque from the second planetary stage, the second and third planetary stages sharing a one-piece common ring gear; and a shift mechanism operable to move the first stage ring gear between a first position, in which the first stage ring gear is rotatably fixed relative to the transmission housing for enabling the first planetary stage, and a second position, in which the first stage ring gear is coupled for co-rotation with the first stage carrier about a central axis for disabling the first planetary stage, wherein an axial position of the common ring gear along the central axis remains unchanged when the first stage ring gear is moved between the first position and the second position.

10. The rotary power tool of claim 9, wherein the transmission is operable in a low speed, high torque mode when the first stage ring gear is moved to the first position.

11. The rotary power tool of claim 9, wherein the transmission is operable in a high speed, low torque mode when the first stage ring gear is moved to the second position.

12. The rotary power tool of claim 9, wherein the transmission housing includes a first plurality of teeth, and wherein the first stage ring gear includes a second plurality of teeth engaged with the first plurality of teeth on the transmission housing when the first stage ring gear is in the first position.

13. The rotary power tool of claim 9, wherein the first stage ring gear includes a first plurality of teeth with which the plurality of first stage planet gears are engageable, and wherein the first stage carrier includes a second plurality of teeth engaged with the first plurality of teeth on the first stage ring gear when the first stage ring gear is in the second position.

14. The rotary power tool of claim 9, wherein the shift mechanism includes a linearly movable shuttle for shifting the first stage ring gear between the first and second positions.

15. The rotary power tool of claim 9, wherein the motor output pinion and the first planetary stage are co-rotatable when the first planetary stage is disabled.

16. The rotary power tool of claim 9, further comprising an adjustable clutch mechanism used in conjunction with the transmission to selectively limit the amount of torque that may be transferred from the transmission to the bit retainer.

17. The multi-stage planetary transmission of claim 1, wherein the common ring gear includes a plurality of clutch dogs extending from a front end of the common ring gear configured to engage a clutch mechanism.

18. The rotary power tool of claim 9, further comprising:

an output shaft; and a clutch mechanism to selectively limit an amount of torque that is transferred form the transmission to the output shaft, wherein the common ring gear includes a plurality of clutch dogs extending from a front end of the common ring gear engageable with the clutch mechanism.

* * * * *